Patented Jan. 9, 1945

2,366,990

UNITED STATES PATENT OFFICE 2,366,990

METHOD OF PURIFICATION OF GLYCEROL FORMED BY FERMENTATION

James S. Wallerstein and Ralph Thomas Alba, New York, N. Y., and Eduard Farber, New Haven, Conn., assignors to The Overly Bio-Chemical Research Foundation, Inc., New York, N. Y., a corporation of New York No Drawing. Application December 18, 1943, Serial No. 514,858

14 Claims. (Cl. 202—57)

This invention relates to a new method of purifying glycerol formed by fermentation. During the course of the fermentation, certain substances are formed which are capable of giving rise to dark colored compounds. Some of these substances, or products formed by them, are distilled along with the glycerol and remain to a large measure in the distilled glycerol.

The impurities cited are only partly removed by the known method of treatment with activated carbon. Thus, for example, when a distilled crude fermentation glycerol concentrate, brownish or black in color, is heated to the boiling point of water for several minutes in the presence of activated carbon, and then filtered free of the carbon, the filtrate will appear as pale yellow or even colorless; on prolonged standing or access of air, however, the color will form again.

The fermentation glycerol may be obtained in various ways known in the art. It may be formed for example by the use of sodium sulfite or bisulphite as steering agent, or by a fermentation conducted under alkaline conditions, or by continuous addition of a neutralizing agent to the fermenting mash so as to maintain the pH in the vicinity of neutrality. In any case the dark coloring impurities are produced. The discoloring substances are particularly marked where wheat is employed as the source of fermentable carbohydrate. They occur also, however, when other sources of fermentable carbohydrate, as for example, molasses, are utilized.

We have found that the substances giving rise to color which are not eliminated by treatment with activated carbon may be substantially removed and the purity of the glycerol improved by treating the impure glycerol solution with small quantities of formaldehyde prior to distillation.

After the addition of the formaldehyde, the solution containing glycerol and the impurities is maintained for a period of time at a slightly alkaline reaction. The optimum range for this treatment lies between pH 7.5 and 9. If the formaldehyde treatment is conducted on the acid side, and the solution not made alkaline, there is little if any removal of the discoloring material. On the other hand, if the pH of the solution is raised appreciably beyond 9 during the digestion period, losses in glycerol were noted and the effectiveness of the treatment diminished.

The digestion of the impure glycerol solution with formaldehyde takes place slowly and a period of at least one hour is required for its completion. It is advantageous to heat the solution in order to speed the reaction. However, excessive heating will drive off formaldehyde before it has had a chance to react with the impurities in the glycerol mash. The optimum temperature range for a rapid and yet fully complete reaction under the process lies in the vicinity of 30° to 60° C.

The amounts of formaldehyde required for the treatment of the impure solutions are relatively small. When very large amounts of formaldehyde are added, some destruction of the glycerol is noted. However, no destruction is caused by the amounts required under our process for purification. Although the amounts of formaldehyde required depend upon the nature and quality of the mash (wheat mashes, for example, require a larger amount than molasses mashes) the maximum amount of formaldehyde that was found to be needed is 5% on the weight of the glycerol. The minimum amount of formaldehyde found to yield appreciable action is 0.2% on the weight of glycerol, in the case of a crude glycerol distillate from a molasses mash. The range of 0.2% to 5% formaldehyde on the weight of glycerol satisfactorily covered all impure glycerol solutions tested. Addition of 33% formaldehyde on the weight of glycerol solution caused a destruction of 2% of the glycerol after prolonged digestion. No destruction of glycerol was noted with smaller amounts of formaldehyde.

Treatment of the impure solutions of glycerol containing the dark coloring matter by means of formaldehyde may be carried out either on the slops prior to their original distillation or it may be carried out on the crude distillate of the glycerol after the initial distillation, but prior to a second or purifying distillation. Larger amounts of formaldehyde are required for treating the original slop than for treating the impure crude glycerol distillate prior to a second purifying distillation. If the treatment is carried out on the slops, best results are obtained if the slops are concentrated prior to the formaldehyde addition. Where no such concentration is carried out prior to the formaldehyde digestion, larger amounts of formaldehyde are needed.

The adjustment of the pH can be carried out by any convenient alkalizing agent, as for example, by sodium carbonate, sodium hydroxide, or slaked lime. The use of slaked lime to adjust the pH is advantageous since the lime frequently eliminates the impurities in the glycerol slops. The precipitate formed by the lime in this case is filtered off from the glycerol liquor after partial concentration.

The treatment described is useful for fermentation glycerol produced from different kinds of carbohydrate materials. It has particular advantage where wheat is used as a source of carbohydrate for the fermentation. In this case, color-forming matters are in particular abundance and the effect of the treatment is most striking. At the end of the digestion and elimination of any remaining free formaldehyde, the oxidation reduction level of the solution is found to be higher than without the formaldehyde under otherwise similar conditions. The formaldehyde thus either exercises an oxidizing action or removes a reducing material.

In conjunction with the formaldehyde digestion it is advantageous to distill the glycerol at a mildly alkaline pH. The pH is not substantially altered during the course of the digestion and accordingly no adjustment is required prior to distilling. Color elimination in the glycerol is aided if the pH for the distillation after the formaldehyde treatment is in the range of 7.5 to 8.5. If the pH is higher than 8.5 some loss in glycerol may occur. When the pH is on the acid side during the distillation, removal of the coloring matter is less efficient.

Where wheat mashes are employed as the source of carbohydrate for the fermentation, it is advantageous that the protein content of the concentrated slops shall be as low as possible during distillation. A large proportion of the proteins in mashes of wheat may be removed by precipitating out the protein at the beginning of the hydrolysis of the flour with the aid of a soluble form of lignin.

Example I

Fermentation glycerol is formed using a hydrolyzed wheat mash in which most of the protein has been precipitated by lignin sulfonic acid as a source of carbohydrate. The glycerol is produced by the addition of magnesium carbonate as a steering agent in combination with aeration of the solution during fermentation. After the fermentation, the alcohol is distilled off and the remaining solution is concentrated to about 25% which condenses the glycerol and other unfermented substances.

The pH is adjusted to 8.5 by means of a lime solution and insoluble matters are filtered off. A 37% solution of formaldehyde is added in an amount equal to about 5% by weight of the estimated glycerol and the solution maintained at a temperature of 45° C. for one hour.

Prior to the digestion with formaldehyde, the solution of concentrated slops readily reduces an aqueous solution of 0.005 M sodium 2.6-dichlorobenzenone indophenol, decolorizing the dye. After the digestion, the boiled concentrate no longer reduces sodium 2.6-dichlorobenzenone indophenol, and no decolorization occurs.

The glycerol containing slops are now further concentrated to near dryness and distilled under vacuum by means of super-heated steam in the known manner. The distilled glycerol in concentrated form is heated with 1% activated carbon, on weight of glycerol; it is pale yellow in color and maintains its color even when exposed to prolonged aeration.

Example II

Crude distilled glycerol is obtained from a sodium sulfite fermentation of molasses. It is dark brown in color. The solution contains 35% glycerol by weight.

The pH of the crude distilled glycerol solution is raised to 8.5 by the addition of 3 N sodium hydroxide. 0.5% formaldehyde on the weight of glycerol present is added. The temperature is raised to 35° C. for a period of 2 hours.

The glycerol is then concentrated to virtual dryness, and then distilled at pH 8.5 under reduced pressure with the aid of superheated steam.

The refined distillate is now treated with 0.5% activated carbon (on the weight of glycerol) and filtered free of the carbon.

The concentrated glycerol is completely colorless, and maintains these conditions despite strong aeration and on prolonged standing.

The formaldehyde treatment at a pH of 7.5–9 removes or destroys the dark coloring matters which are not eliminated by treatment with activated carbon. When used in conjunction with the activated carbon treatment as previously described, it will serve to make possible the production of a colorless or light yellow glycerol with a high degree of purity, from fermentation mashes.

We claim:

1. The method of obtaining pure glycerol from fermented carbohydrate solutions by distillation, which consists in treating the impure glycerol solutions with small quantities of formaldehyde and maintaining the solution for a period of about one hour at an alkaline reaction prior to a distillation.

2. The method of obtaining pure glycerol from fermented carbohydrate solutions by distillation, which consists in treating the impure glycerol solutions with small quantities of formaldehyde and maintaining the solution for a period of about one hour at pH 7.5 to 9 prior to a distillation.

3. The method of obtaining pure glycerol from fermented carbohydrate solutions by distillation, which consists in treating the impure glycerol solutions with small quantities of formaldehyde and maintaining the solution warm for a period of about one hour at pH 7.5 to 9 prior to a distillation.

4. The method of obtaining pure glycerol from fermented carbohydrate solutions by distillation, which consists in treating the impure concentrated glycerol solutions with small quantities of formaldehyde and maintaining the concentrated solution warm for a period of about one hour at a pH between 7.5 and 9 prior to a distillation.

5. The method of obtaining pure glycerol from fermented carbohydrate solutions by distillation, which consists in treating the impure concentrated solutions with between 0.2 and 5% formaldehyde (calculated on the weight of glycerol) and maintaining the concentrated solution warm for a period of about one hour at a pH between 7.5 and 9 prior to a distillation.

6. The method of obtaining pure glycerol from fermented carbohydrate solutions by distillation, which consists in treating the impure concentrated solutions with between 0.2 and 5% formaldehyde (calculated on the weight of glycerol) and maintaining the concentrated solution for a period of about one hour at a pH between 7.5 and 9 and at a temperature about 30° C. to about 60° C. prior to a distillation.

7. The method of obtaining pure glycerol from fermented carbohydrate solutions by distillation, which consists in treating the concentrated glycerol slops with between 0.2% and 5% formaldehyde (calculated on the weight of glycerol) and maintaining the concentrated solution for a period of about one hour at a pH between 7.5 and 9, and at a temperature between about 30° C. to about 60° C. prior to a distillation.

8. The method of obtaining pure glycerol from fermented carbohydrate solutions by distillation, which consists in treating a crude distilled glycerol with between 0.2% and 5% formaldehyde (calculated on the weight of glycerol) and maintaining the concentrated solution for a period of about one hour at a pH between 7.5 and 9, and at a temperature between about 30° to about 60° C. prior to a distillation.

9. The method of obtaining pure glycerol from fermented carbohydrate solutions by distillation, which consists in treating the concentrated glycerol slops with between 0.2% and 5% formaldehyde (calculated on the weight of glycerol) and maintaining the concentrated solution for a period of about one hour at a pH between 7.5 and 9, and at a temperature between about 30° to about 60° C. prior to a distillation of the concentrated slops at a pH between 7.5 and 8.5.

10. The method of obtaining pure glycerol from fermented carbohydrate solutions by distillation, which consists in treating a crude distilled glycerol with between 0.2% and 5% formaldehyde (calculated on the weight of glycerol) and maintaining the concentrated solution for a period of about one hour at a pH between 7.5 and 9, and at a temperature between 30° and 60° C. prior to re-distilling the crude distilled glycerol at a pH between 7.5 and 8.5.

11. The method of obtaining pure glycerol by distillation from fermented carbohydrate solutions derived from wheat mashes, which consists in treating the concentrated glycerol slops with between 0.2% and 5% formaldehyde (calculated on the weight of glycerol) and maintaining the concentrated solution for a period of about one hour at a pH between 7.5 and 9, and at a temperature between about 30° and 60° C. prior to distilling at a pH between 7.5 and 8.5

12. The method of obtaining pure glycerol by distillation from fermented carbohydrate solutions derived from wheat mashes, which consists in treating a crude distilled glycerol with between 0.2% and 5% formaldehyde (calculated on the weight of glycerol) and maintaining the concentrated solution for a period of about one hour at a pH between 7.5 and 9, and at a temperature between about 30° to about 60° prior to re-distilling the crude distilled glycerol at a pH between 7.5 and 8.5.

13. The method of obtaining pure glycerol by distillation from fermented carbohydrate solutions derived from wheat mashes from which most of the protein has been removed by precipitation with a soluble form of lignin, which consists in treating the concentrated glycerol slops with between 0.2% and 5% formaldehyde (calculated on the weight of glycerol) and maintaining the concentrated solution for a period of about one hour at a pH between 7.5 and 9, and at a temperature between about 30° to about 60° C. prior to distilling at a pH between 7.5 and 8.5.

14. The method of obtaining pure glycerol by distillation from fermented carbohydrate solutions derived from wheat mashes from which most of the protein has been removed by precipitation with a soluble form of lignin, which consists in treating a crude distilled glycerol with between 0.2% and 5% formaldehyde (calculated on the weight of glycerol) and maintaining the concentrated solution for a period of about one hour at a pH between 7.5 and 9, and at a temperature between about 30° to about 60° C. prior to re-distilling the crude distilled glycerol at a pH between 7.5 and 8.5.

JAMES S. WALLERSTEIN.
RALPH THOMAS ALBA.
EDUARD FARBER.